(12) United States Patent
Xu (10) Patent No.: US 9,868,342 B2
(45) Date of Patent: Jan. 16, 2018

(54) R ANGLE WITH FLAT SURFACE TO INCREASE THE ADHESIVE STRENGTH (71) Applicant: Cixi City Liyuan Auto Parts Co., Ltd, Cixi (CN)

(72) Inventor: Enli Xu, Cixi (CN)

(73) Assignee: CIXI CITY LIYUAN AUTO PARTS CO., LTD., Cixi (CN)

(*) Notice: Subject to any disclaimer, the term of this patent is extended or adjusted under 35 U.S.C. 154(b) by 254 days.

(21) Appl. No.: 14/400,789

(22) PCT Filed: Nov. 3, 2014

(86) PCT No.: PCT/CN2014/090186
§ 371 (c)(1),
(2) Date: Nov. 12, 2014

(87) PCT Pub. No.: WO2016/070311
PCT Pub. Date: May 12, 2016

(65) Prior Publication Data
US 2016/0263974 A1 Sep. 15, 2016

(51) Int. Cl.
*B60J 7/06* (2006.01)
*B60J 7/08* (2006.01)
*B60J 7/10* (2006.01)

(52) U.S. Cl.
CPC .............. *B60J 7/067* (2013.01); *B60J 7/061* (2013.01); *B60J 7/085* (2013.01); *B60J 7/104* (2013.01)

(58) Field of Classification Search
CPC ... B60J 7/104; B60J 7/085; B60J 7/067; B60J 7/061

USPC ........................................ 296/100.16, 100.02
See application file for complete search history.

(56) References Cited

U.S. PATENT DOCUMENTS

| | | | | |
|---|---|---|---|---|
| 4,757,854 A | * | 7/1988 | Rippberger | F16B 5/0692 160/378 |
| 5,385,377 A | * | 1/1995 | Girard | B60J 7/104 296/100.16 |
| 6,024,401 A | * | 2/2000 | Wheatley | B60J 7/102 296/100.17 |
| 6,568,740 B1 | * | 5/2003 | Dimmer | B60J 7/085 296/100.11 |
| 7,621,591 B2 | * | 11/2009 | Arellano | B60R 13/0231 296/214 |
| 7,815,239 B1 | * | 10/2010 | Schmeichel | B60J 11/00 296/136.01 |
| 7,905,536 B2 | | 3/2011 | Yue | |

(Continued)

*Primary Examiner* — Pinel E Romain
(74) *Attorney, Agent, or Firm* — Kilpatrick Townsend & Stockton LLP (57) ABSTRACT

Embodiments provide fastening slats for use in a flexible tonneau cover system for covering and sealing a bed of a pickup truck. The fastening slat may include a substantially flat elongated slat having a width and a thickness. The elongated slat may be insertable in a channel of a side rail of the flexible tonneau cover system. The fastening slat may also include a first fastening portion coupled with a substrate that is configured to wrap around at least a portion of the elongated slat such that at least a portion of the substrate contacts a bottom surface of the elongated slat. The first fastening portion may be coupleable to a second fastening portion of a flexible cover of the flexible tonneau cover system that is extendable over a bed of a pickup truck.

20 Claims, 12 Drawing Sheets (56) References Cited

U.S. PATENT DOCUMENTS

| | | | | |
|---|---|---|---|---|
| 8,061,758 B2* | 11/2011 | Maimin | ............... | B60J 7/141 296/100.09 |
| 8,430,441 B2* | 4/2013 | Waterman | ............ | B60R 13/01 296/136.01 |
| 8,480,154 B2 | 7/2013 | Yue | | |
| 8,523,266 B2 | 9/2013 | Yue | | |
| 8,573,678 B2 | 11/2013 | Yue | | |
| 8,632,114 B2* | 1/2014 | Yue | ..................... | B60J 7/141 296/100.02 |
| 2003/0057726 A1* | 3/2003 | Wheatley | ............. | B60J 7/102 296/100.18 |
| 2005/0067854 A1* | 3/2005 | Lester | .................. | B60J 7/102 296/100.18 |
| 2008/0104808 A1* | 5/2008 | Badalamenti | ........ | B60J 7/104 24/459 |
| 2008/0230665 A1* | 9/2008 | Palermo | ............ | B60P 7/0815 248/231.71 |
| 2011/0215611 A1* | 9/2011 | Demedash | ............ | B60P 7/02 296/100.16 |

* cited by examiner

R ANGLE WITH FLAT SURFACE TO INCREASE THE ADHESIVE STRENGTH

CROSS-REFERENCES TO RELATED APPLICATIONS

This application is a U.S. National Stage of International Application No. PCT/CN2014/090186, filed to China Intellectual Property Office on Nov. 3, 2014, and entitled "R ANGLE WITH FLAT SURFACE TO INCREASE THE ADHESIVE STRENGTH", hereby incorporated herein by reference.

BACKGROUND

Flexible covers are often used to cover and seal the beds of pickup trucks to protect cargo from weather, debris, and other damaging conditions. Oftentimes, the cover will be connected to a rail that is attached to the bed of the truck using a releasable fastener, such as a hook and loop fastener. The fasteners are often coupled to the rails using slats that may slide into a channel within the rails. Conventional fasteners are secured onto the slats using an adhesive or by stitching. The release force from the separation of the fastener on the rail and the fastener on the cover may exceed the holding force of adhesives used to secured the fastener to the slat, leading to the peeling and ultimate separation of the fastener from the slat. In systems using stitched on fasteners, the stitching reduces the area on which force is applied on the fastener. This reduction in area results in increased force on the area near the stitching, leading to the fastener be damaged and/or separated from the rail.

BRIEF SUMMARY

Embodiments of the invention provide fastening elements to secure flexible tonneau covers to pickup truck beds. In one aspect, a fastening slat for use in a flexible tonneau cover system for covering and sealing a bed of a pickup truck is provided. The fastening slat may include a substantially flat elongated slat having a width and a thickness. The elongated slat may be insertable in a channel of a side rail of the flexible tonneau cover system. The fastening slat may also include a first fastening portion coupled with a substrate that is configured to wrap around at least a portion of the elongated slat such that at least a portion of the substrate contacts a bottom surface of the elongated slat. The first fastening portion may be coupleable to a second fastening portion of a flexible cover of the flexible tonneau cover system that is extendable over a bed of a pickup truck.

In another aspect, a fastening slat for use in a flexible tonneau cover system for covering and sealing a bed of a pickup truck is provided. The fastening slat may include an elongated slat. The elongated slat may be insertable in a channel of a side rail of the flexible tonneau cover system. The fastening slat may also include a first fastener having a fastening portion and a backing. The backing may include one more wings that extend beyond an outer periphery of the fastening portion. The first fastening portion may be positioned over at least a portion of a top surface of the elongated slat and the one or more wings may be wrapped around the elongated slat such that at least a portion of the one or more wings extends along at least a portion of a bottom surface of the elongated slat. The first fastening portion may be coupleable to a second fastening portion of a flexible cover of the flexible tonneau cover system that is extendable over a bed of a pickup truck.

In another aspect, a fastening slat for use in a flexible tonneau cover system for covering and sealing a bed of a pickup truck is provided. The fastening slat may include an elongated slat. The elongated slat may be insertable in a channel of a side rail of the flexible tonneau cover system. The fastening slat may further include a sleeve configured to wrap around the elongated slat and to extend along at least a portion of a length of the elongated slat. The fastening slat may also include a first fastening portion coupled with the sleeve. The first fastening portion may be coupleable to a second fastening portion of a flexible cover of the flexible tonneau cover system that is extendable over a bed of a pickup truck.

DETAILED DESCRIPTION OF THE DRAWINGS

Embodiments of the invention provide fastening elements to secure flexible tonneau covers to pickup truck beds. The fastening elements described herein provide cost effective ways to seal pickup beds, while being sufficiently sturdy to withstand repeated separation of fastening elements on the rails and fastening elements on the cover system. The fastening elements described herein increase the area on which the release forces act to reduce the amount of force applied to any one area of the fastening element. By reducing the amount of force applied on any one area of the fastener, the fastener is more resistant to being damaged and/or torn from the substrate on which it is secured.

In one aspect, a fastening slat for use in a flexible tonneau cover system is provided. The fastening slat may include an elongated slat having a width and a thickness. In some embodiments, the width of the elongated slat is greater than the thickness. The elongated slat may be insertable into a channel of a side rail of the flexible tonneau cover system. In some embodiments, the elongated slat may be slid into the channel and secured by one or more retaining members configured to secure the elongated slat within the channel when the elongated slat is subjected to forces, such as release forces caused by the separation of the fastener on the elongated slat and a fastener on the flexible cover. In some embodiments, the retaining members may run along all or substantially all of a length of the elongated slat. This helps disperse the applied force along all or much of the one or more edges of the elongated slat to increase durability. In some embodiments, the elongated slat may be a substantially flat piece of material. In other embodiments, ridges, grooves, and/or other raised and/or lower surface elements may extend along are or a portion of the elongated slat. Such surface elements may be configured to mate with the retaining members or otherwise prevent movement of the elongated slat. In some embodiments, the elongated slat is removable from the channel to allow reconfiguration of the side rails and/or replacement of any elongated slats within a flexible cover system. The elongated slat may be rigid or flexible, and may be constructed out of plastic, metal, or any other material that can withstand the release forces while remaining secured within the retaining members.

In some embodiments, rather than having retaining members, the elongated slat and/or the side rail may include magnetic materials to retain the elongated slat in the channel. Magnets may be selected that have sufficient magnetic force to overcome the release forces subjected to as the cover is unfastened from the slat. In other embodiments, the elongated slats may be configured to snap into the retaining members to secure the elongated slats within the channel.

The fastening slat may also include a fastening portion coupled with a substrate that is configured to wrap around at least a portion of the elongated slat. The fastening portion may be configured to couple the flexible cover to the side rail while sealing the pickup bed from outside elements. In some embodiments, the fastening portion may include a hook or a loop fastener that is coupleable with a corresponding hook or loop fastener of the flexible cover. In other embodiments, the fastening element may include magnets, snaps and/or any other fastening mechanism. The fastening element may be chosen for its ability to secure a cover to seal a truck bed. In some embodiments, multiple fastening elements may be incorporated into a single side rail and/or cover to provide added strength and/or sealing capabilities. For example, a hook and loop fastener may be used in conjunction with a magnetic element to couple a side rail with a flexible cover. All or substantially all of a bottom surface of the fastening portion may be coupled to the substrate such that the area on which the release force applied is maximized. This decreases the amount of force applied to any one area of the fastener. This may be done by forming the fastener portion integral with the substrate or by securing the fastening portion onto the substrate. For example, the fastening portion may be secured to the substrate by an adhesive, stitching, sonic welding, and/or by any other coupling method. In some embodiments, one or more methods for securing the fastening portion to the substrate. For example, the fastening portion may be adhered and stitched to the substrate.

In some embodiments, the substrate secures the fastener with the elongated slat. The fastening portion may be coupled with the sleeve using one or more of an adhesive, stitching, or sonic welding. Embodiments using welding and/or adhesives cause an increase of coupling surface area to strengthen the bond and distribute forces applied to the fastening portion. By wrapping around to a bottom surface and coupling to all or a large portion of the bottom surface, the bonding strength and distribution of forces is enhanced. In some embodiments, the substrate may be a sleeve that is slidable over the elongate slat. The sleeve may be configured to wrap around the elongated slat and to extend along at least a portion of a length of the elongated slat. The sleeve may include a rectangular piece of material that is wrapped around a longitudinal axis of the material such a first end of the material is secured to a second end of the material. In other embodiments, the material may be wrapped around an axis of the material that is transverse to the longitudinal axis. In some embodiments, the sleeve may be formed from a material in a single piece, without ends and/or seams. In other embodiments, the sleeve may have other shapes. The sleeve may be made of any material. For example, the sleeve may be formed from a flexible material, such as a fabric or cloth that is wrapped or rolled to form a sleeve, or may be a plastic, a metal, or other synthetic material that is formable into the sleeve shape.

In some embodiments, the substrate may be a backing of the fastening portion. For example, the backing may be a backing of a hook and loop fastener on which the hooks and/or loops are formed. In some embodiments, the backing may include one more wings that extend beyond an outer periphery of the fastening portion. The fastening portion may be positioned over at least a portion of the top surface of the elongated slat with the one or more wings wrapping around at least one of the edges of the elongated slat such that at least a portion of the one or more wings extends along at least a portion of the bottom surface of the elongated slat. For example, one wing may wrap around and be coupled to, all or part of the bottom surface. In other embodiments, the one wing may wrap entirely around the elongated slat such that the wing comes into contact with the backing underneath the fastening portion to form a sleeve. In other embodiments, two wings may extend from opposite sides and wrap around the elongated slat. The two wings may be coupled to one another or may be secured directly to the elongated slat, such as on the bottom surface. For example, a first wing having a first end and a second wing having a second end may extend from opposite sides of a backing. The first end may overlap with at least a portion of the second end such that a sleeve is formed. The first wing may be coupled with the second wing. The two wings may be coupled with an upper surface of one end contacting a lower surface of the other end, or by having both upper surfaces or both lower surfaces of the ends in contact with one another. In other embodiments, two or more wings may extend from adjacent sides. The one or more wings may extend along a width or a length of the elongated slat. While described with having one or two wings, it will be appreciated that any number of wings may be used from one or more sides of the backing.

In some embodiments, the one or more wings are secured to the elongated slat using one or more of an adhesive, stitching, sonic welding, or other method of securing the surfaces. In other embodiments, the backing and wings may form a sleeve that is slidably removable from the elongated slat. In such embodiments, the wings may be secured to one another and/or to the rest of the backing using one or more of an adhesive, stitching, sonic welding, or other method of securing the surfaces.

In some embodiments, the sleeve formed from the backing may have an outer surface that is coupled with the fastening portion and an inner surface that is at least partially in contact with the elongated slat. The inner surface may include a first end and a second end on opposite sides of the inner surface. The first end may be coupled directly to the second end of the inner surface.

Figure 1A:
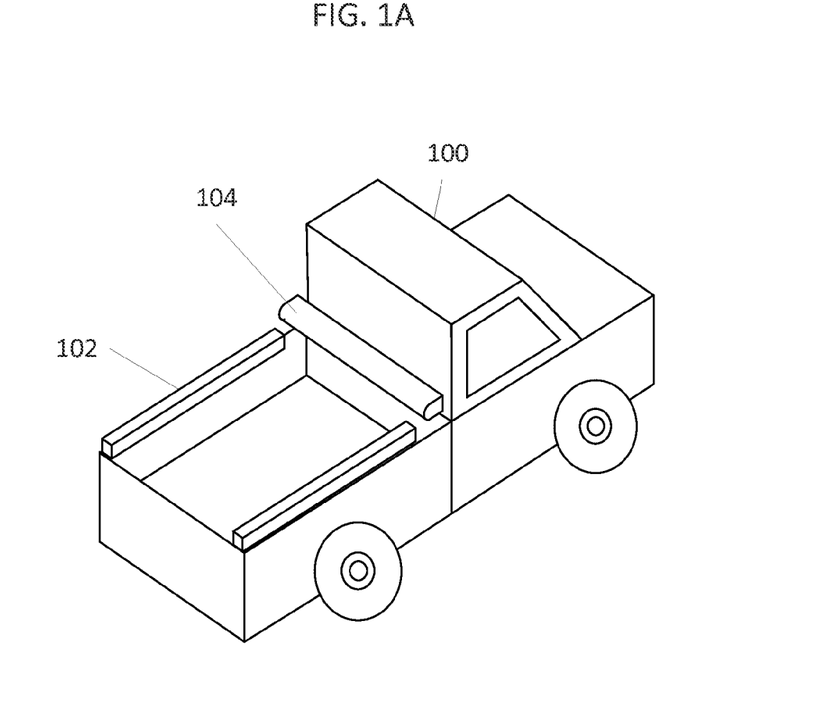
FIG. 1A depicts a pickup having a flexible tonneau cover system in a storage configuration according to embodiments.
Figure 1B:
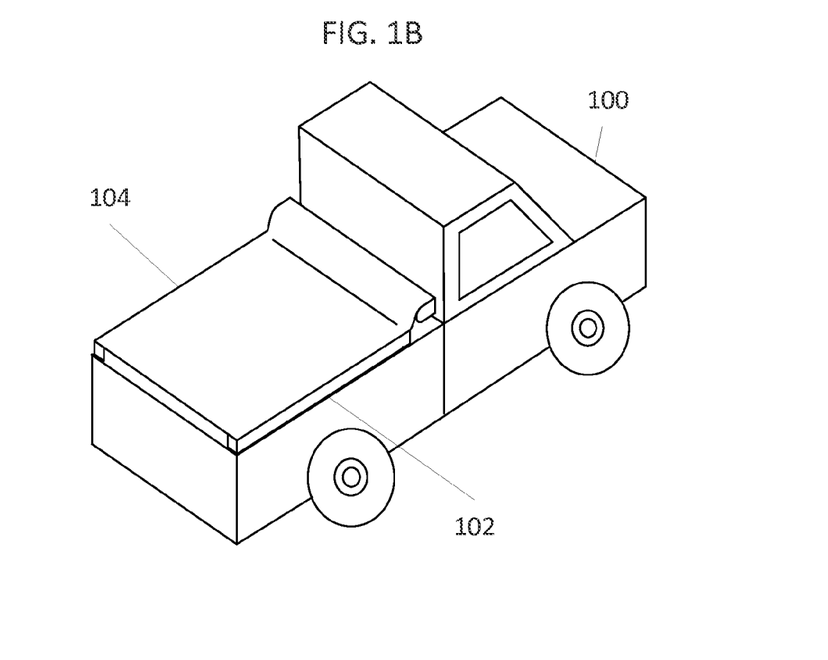
FIG. 1B depicts the pickup of FIG. 1A having the flexible tonneau cover system in an extended configuration according to embodiments.

Referring now to FIGS. 1A and 1B, an embodiment of a pickup truck 100 having a flexible tonneau cover is shown. Truck 100 may include a set of side rails 102 that may be coupled with a top edge of side walls of a bed of truck 100. The truck 100 may also include a flexible cover 104. In some embodiments, flexible cover 104 may be coupled with a back of a cab of truck 100 or with a front of the bed of truck 100. As seen in FIG. 1A, flexible cover 104 may be in a first, stowed configuration. In the stowed configuration, the flexible cover 104 may be rolled or otherwise folded and stored at a front of the bed of truck 100. As seen in FIG. 1B, flexible cover 104 may also be in a second, extended configuration. In the extended configuration, flexible cover 104 may be drawn over all or part of the bed of truck 100, such that all or a portion of the bed of truck 100 is sealed from the elements. Flexible cover 104 may be coupled with side rails 102 using one or more fasteners positioned along a length of the flexible cover 104 and/or the side rails 102.

Figure 2:
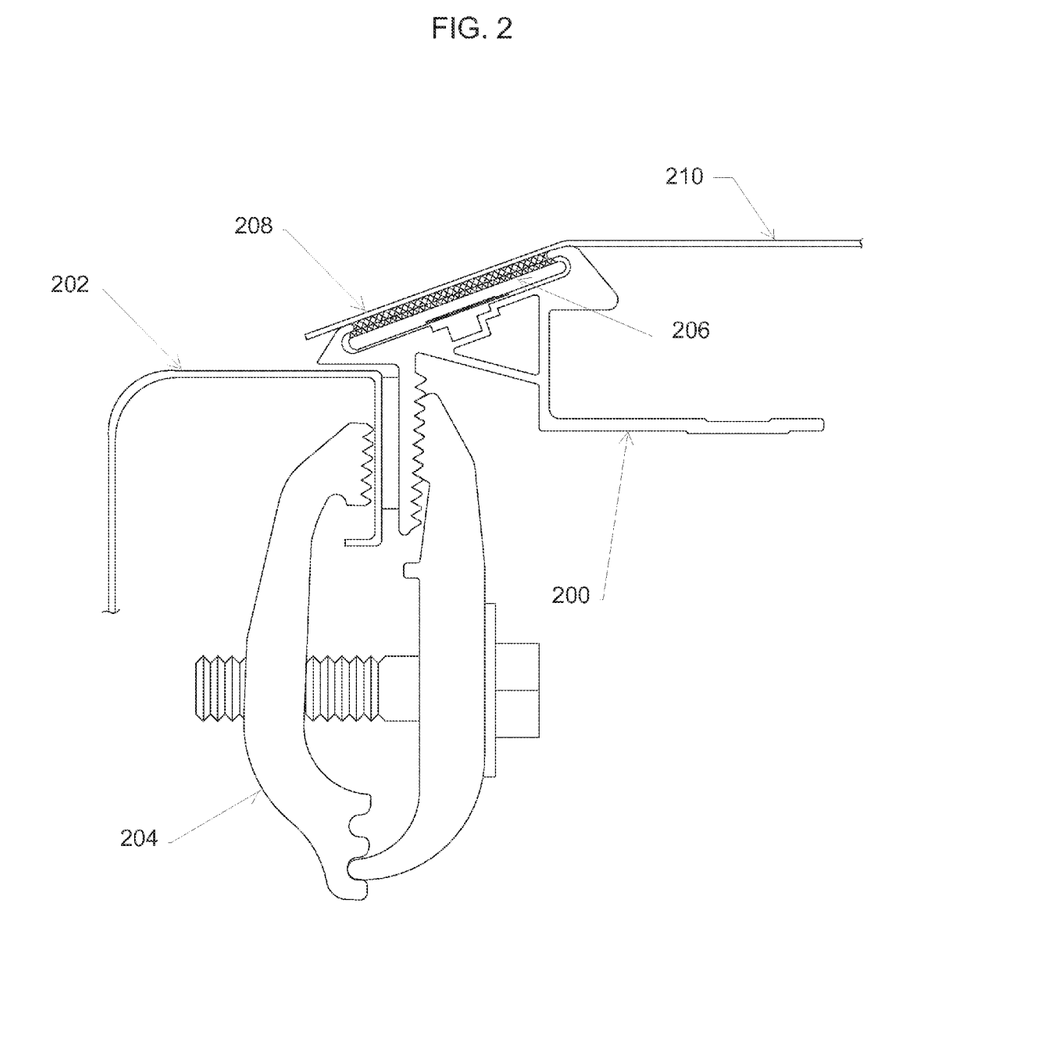
FIG. 2 depicts a side rail for securing a flexible tonneau cover secured to a pickup bed according to embodiments.

FIG. 2 shows an embodiment of a side rail 200 attached to an upper edge 202 of a side wall of a bed of a pickup truck. Side rail 200 may be permanently mounted on the upper edge 202, removeably secured using a fastener, and/or may be mounted using a clamp 204. Clamp 204 may attach to a portion of the upper edge 202, such as an inner surface, as well as an inner surface of side rail 200. In some embodiments, the inner surface of side rail 200 may be textured to mate with a corresponding surface of clamp 204 to ensure the side rail 200 does not slip when mated with clamp 204. The side rail 200 may be configured to receive and secure a fastening slat having a first fastening portion 206. The first fastening portion 206 may be any fastener, such as a hook and loop fastener or a snap. The first fastening portion 206 may be configured to mate with a second fastening portion 208 that is positioned on a flexible cover 210. By coupling the two fastening portions together, the flexible cover 210 may remain in an extended configuration to cover and seal a bed of the pickup truck.

Figure 3A:
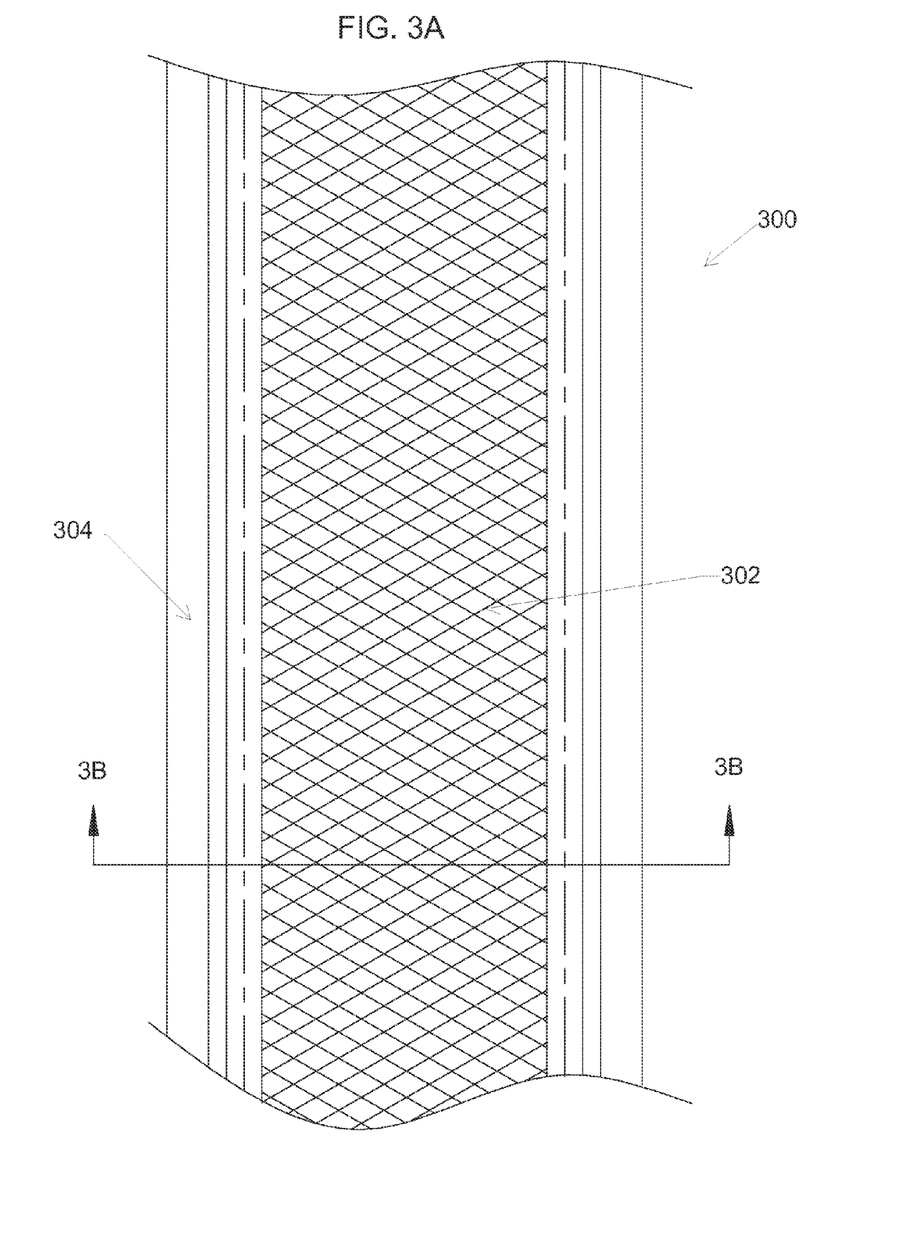
FIG. 3A depicts a top view of a fastening slat having a fastener coupled with a sleeve according to embodiments.
Figure 3B:
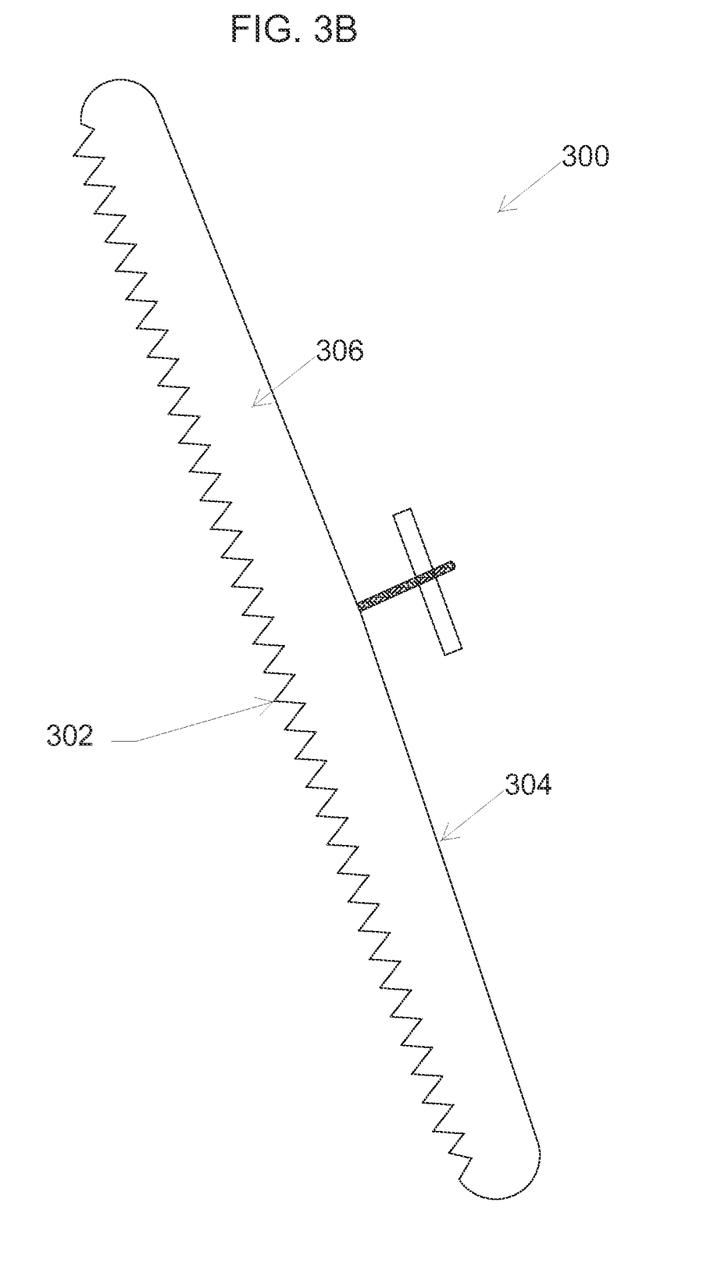
FIG. 3B depicts a side view of the fastening slat of FIG. 3A according to embodiments.
Figure 3C:
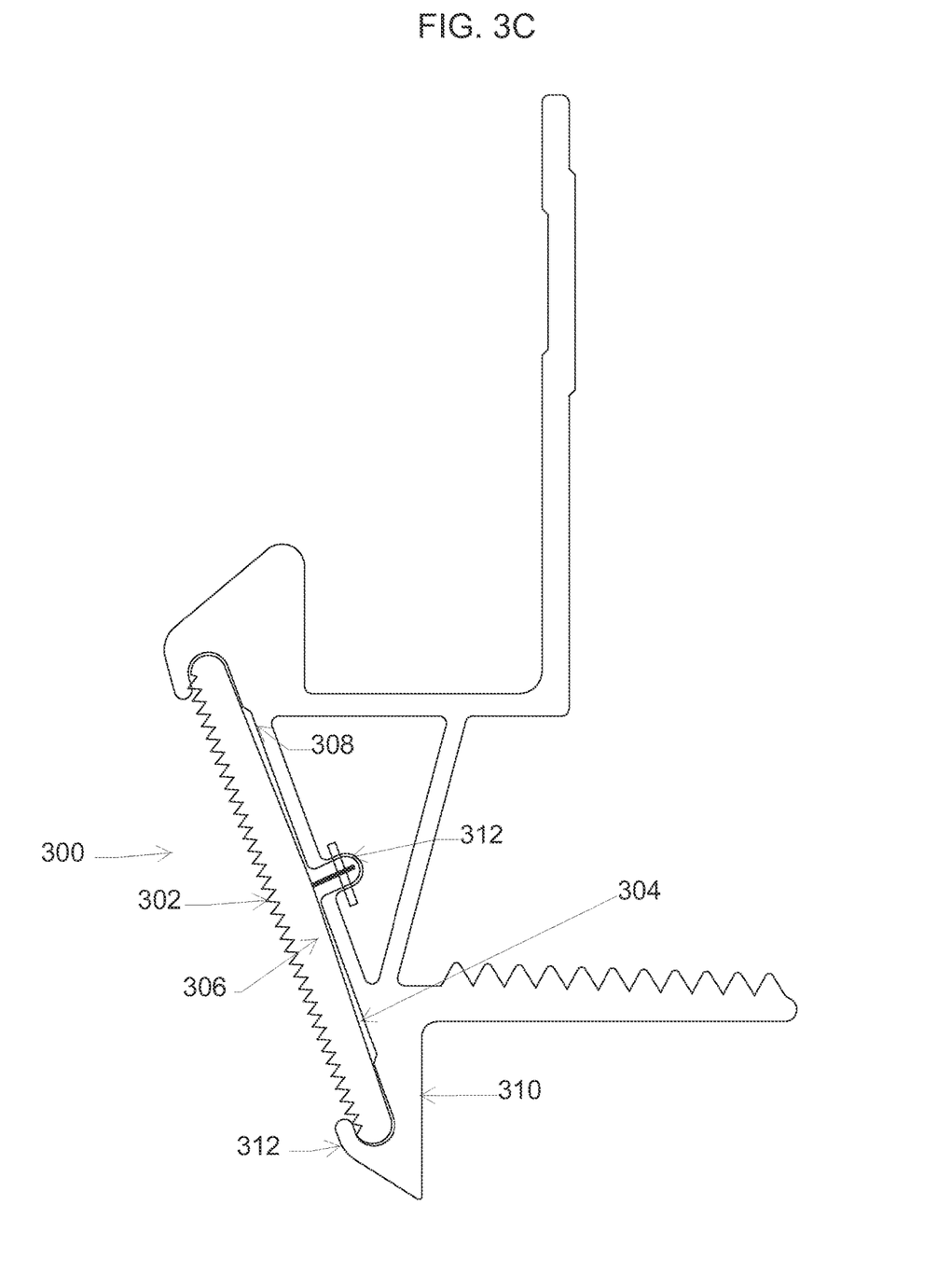
FIG. 3C depicts the fastening slat of FIG. 3A inserted in a side rail according to embodiments.

Referring now to FIGS. 3A-3C, an embodiment of a fastening slat 300 is shown. For example, FIG. 3A shows a top view of fastening slat 300 have a fastening portion 302 coupled to a substrate or sleeve 304. Fastening portion 302 may be a hook or loop fastener that is configured to couple with a corresponding hook or loop fastener of a flexible pickup bed cover. In some embodiments, other types of fasteners, such as magnets and/or snaps may be used instead of, or in conjunction with, the hook or loop fastener to couple fastening slat 300 with a flexible cover. The sleeve 304 may be wrapped around an elongated slat 306, as shown in FIG. 3B. While shown wrapped around a longitudinal axis, it will be appreciated that as sleeve 304 may wrap around an axis transverse to the longitudinal axis of elongated slat 306. Sleeve 304 may have a first end and a second end extending in a direction opposite from the first end. In some embodiments, the first end may be secured to the second end, such as by stitching, adhesives, sonic welding, and/or any other coupling method. Each of the first end and the second end may include a top surface and a bottom surface. In some embodiments, the top surface of the first end may be coupled with the top surface of the second end, such that the ends point away from the elongated slat 306. In other embodiments, the bottom surface of the first end may be coupled with the bottom surface of the second end, such that the ends point toward from the elongated slat 306. In other embodiments, the top or bottom surface of the first end may be coupled with the opposite surface of the second end, such that the ends lay substantially parallel to the surface of the elongated slat 306.

The first end may be secured to the second end using stitching, an adhesive, sonic welding, and/or other methods of securing material. In some embodiments, multiple methods of securing the two ends to each other may be used. This may increase the strength of the coupling and/or provide a failsafe on the chance that one of the securement methods fails. By having the substrate or sleeve 304 wrap around the elongated slat 306, release forces pull an inner surface of sleeve 304 against the bottom surface of elongated slat 306. The forces are distributed across all or substantially all of the inner surface of sleeve 304 that is in contact with the bottom surface of the elongated slat 306. This prevents excess force from affecting a small area of the sleeve 304.

In other embodiments, the sleeve 304 may be formed without ends. For example, a seamless sleeve may be formed from a cloth or synthetic material such as a plastic. In some embodiments, the sleeve 304 may be slidable onto and off of the elongate slat 306. By being removable, sleeves 304 and fastening portions 302 may be switched out while keeping the same elongated slats 306. For example, a sleeve 304 having a fastening portion 302 having a hook and loop fastener may be swapped out for a sleeve 304 having a snap fastener while reusing the elongated slat 306. This can save money while providing versatility to the fastening slats 300. Additionally, the replaceability allows only the sleeve 304 to be replaced when damaged, rather than the entire fastening slat 300. In other embodiments, the sleeve 304 may be secured to the elongated slat 306. This may be done using an adhesive, stitching, sonic welding, and/or any other method of securing the components.

The elongated slat 306 may have a length, a width, and a thickness. In some embodiments, the width may be greater than the thickness. Elongated slat 306 may be configured to fit within a channel 308 of side rail 310 as seen in FIG. 3C. Side rail 310 may include one or more retaining members 312 that may secure the elongated slate 306 and sleeve 304 within the channel 308. In some embodiments, channel 308 may include a slit 314 extending along a longitudinal axis of the channel 308 such that any excess material from the sleeve 304, such as from the coupling of the first end and the second end, may be positioned within the slit 314. In some embodiments, retaining members 312 may be configured to contact a top surface of the elongated slat 306 and/or sleeve 304 to retain the elongated slat 306 within channel 308 while being subjected to release forces. For example, elongated slat 306 may be configured to slide into retaining members 312, while in other embodiments, elongated member 306 may snap into the retaining members 312. In other embodiments, retaining members 312 may include magnets that are sufficiently strong to retain the elongated slat 306 within channel 308 when subjected to release forces.

Figure 4A:
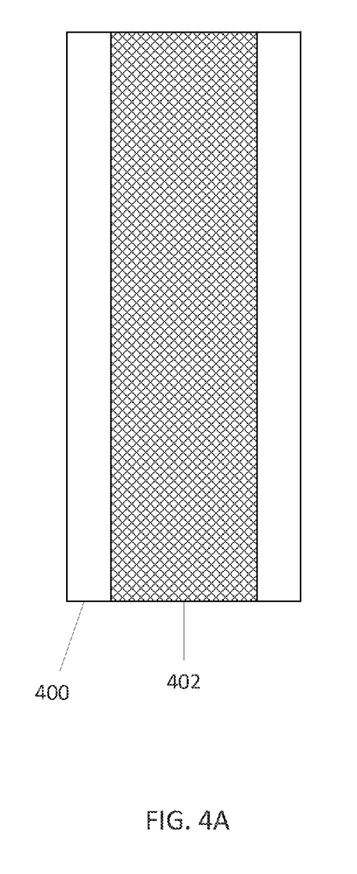
FIG. 4A depicts a top view of a fastening slat having a fastener coupled with a sleeve according to embodiments.
Figure 4B:
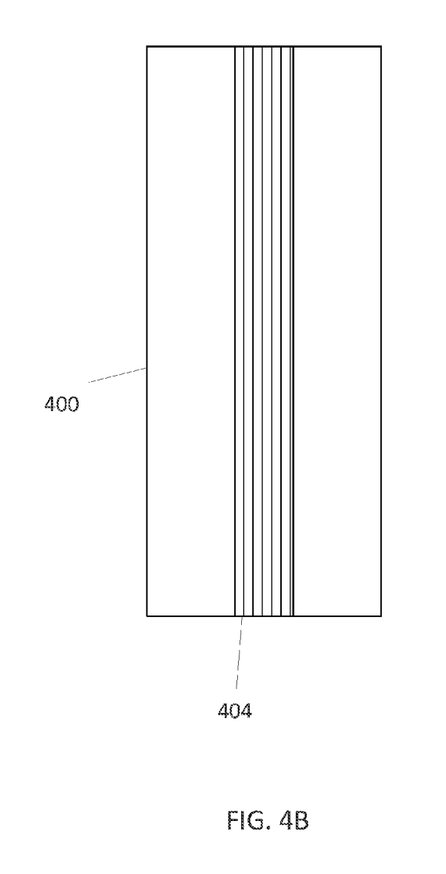
FIG. 4B depicts a bottom view of a fastening slat having a fastener coupled with a sleeve according to embodiments.

FIGS. 4A and 4B depict an embodiment of a sleeve 400 that is wrappable around an elongated slat as described herein. FIG. 4A is a top view of sleeve 400 having a fastening portion 402, such as a hook and loop fastening strip secured to the sleeve 400. The fastening portion 402 may be secured to the sleeve 400 using stitching, sonic welding, and/or an adhesive. FIG. 4B is a bottom view of sleeve 400. Material forming the sleeve 400 may wrap around an axis of the material. Opposite ends of the material may be secured to one another at a coupling region 404. The ends may be secured using stitching, sonic welding, and/or an adhesive. For example, inner surfaces of each end may be positioned adjacent one another and a single row of stitching may be used to secure the ends together.

Figure 5:
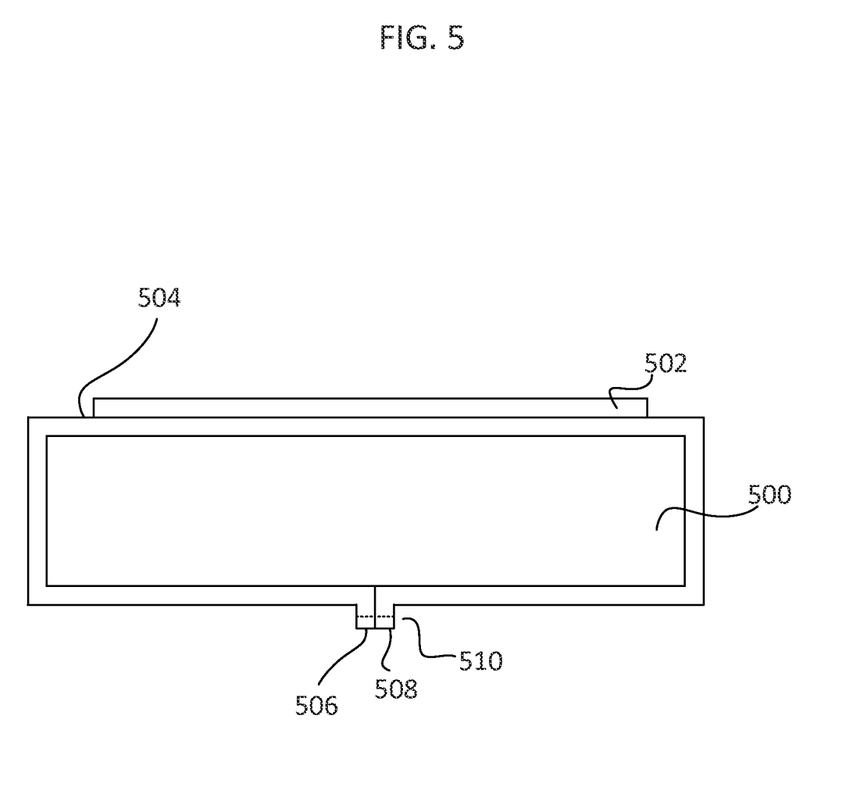
FIG. 5 depicts a side view of a fastening slat having a fastener coupled with a sleeve according to embodiments.

FIG. 5 shows a side view of an embodiment of an elongated slat 500 coupled with a fastening portion 502 using a sleeve 504. For example, sleeve 504 and fastening portion 502 may be as described above in FIGS. 4A and 4B. Sleeve 504 may be coupled with fastening portion 502, such as a hook and loop fastener strip, and may be configured to wrap around elongated slat 500. Sleeve 502 may include a first end 506 and a second end 508 positioned opposite the first end 506. Inner surfaces of the first end 506 and the second end 508 may be positioned adjacent to one another such that edges of the first end 506 and second end 508 point away from elongated slat 500. The inner surfaces may be coupled using stitching and/or sonic welding at or near stitching portion 510. For example, a single row of stitching may run along an entire length of sleeve 502 at stitching portion 510 to secure the ends 506 and 508 together. In other embodiments, an adhesive may be used to couple the first end 506 and second end 508 together.

Figure 6A:
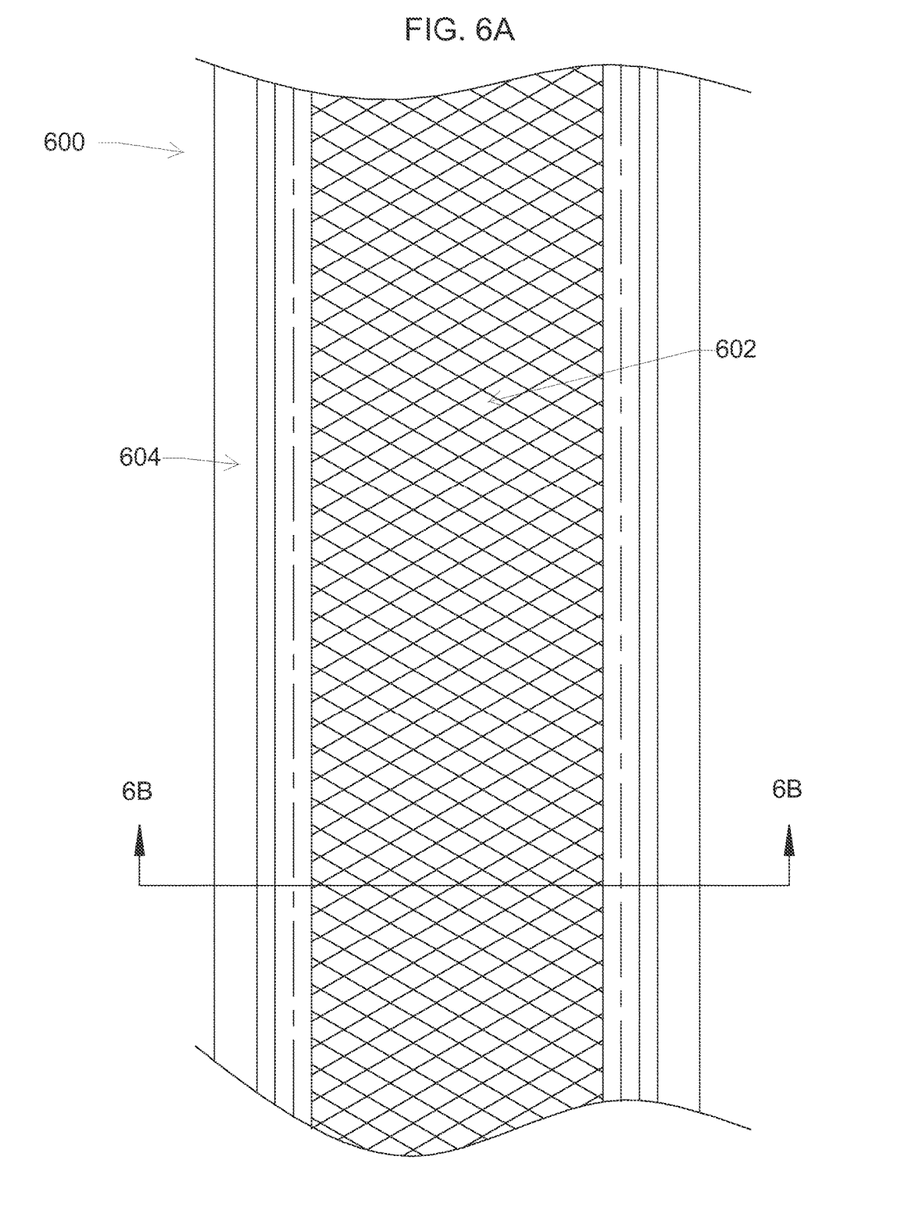
FIG. 6A depicts a top view of a fastening slat having a fastener coupled with a backing according to embodiments.
Figure 6B:
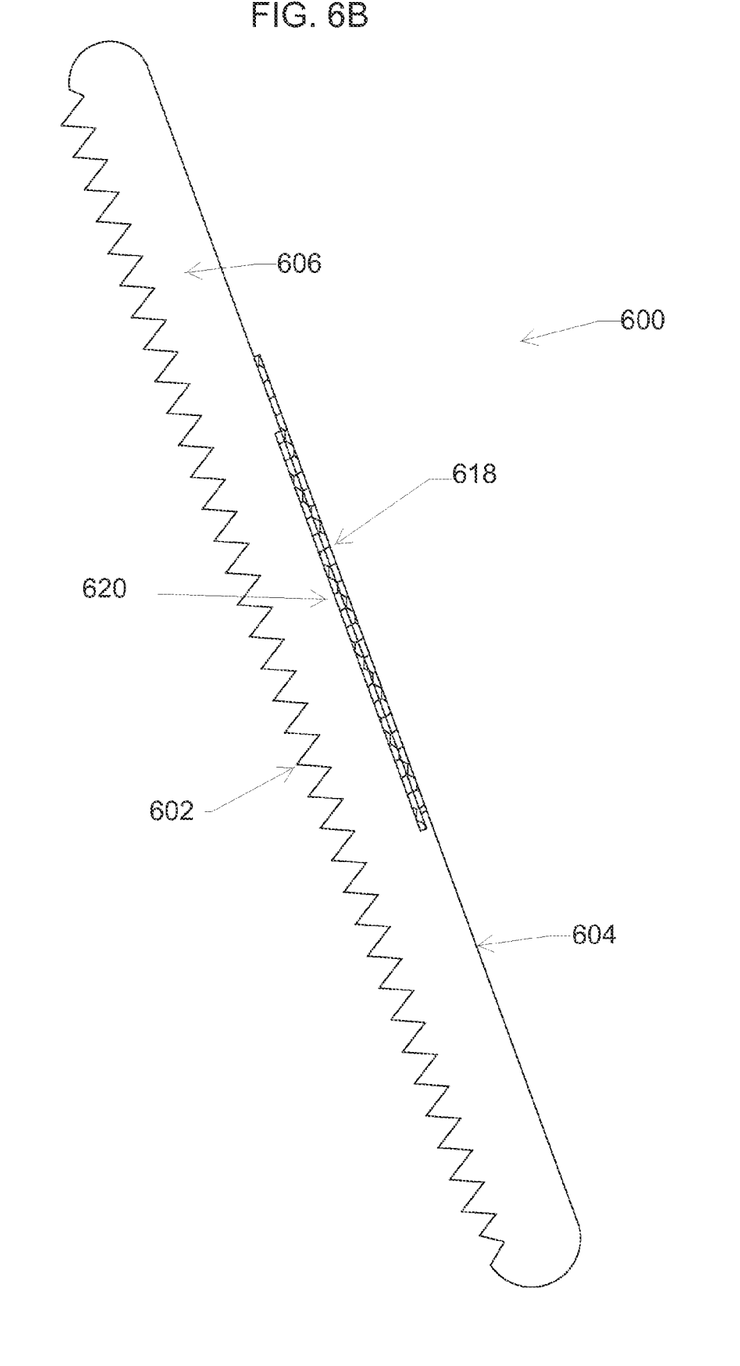
FIG. 6B depicts a side view of the fastening slat of FIG. 6A according to embodiments.
Figure 6C:
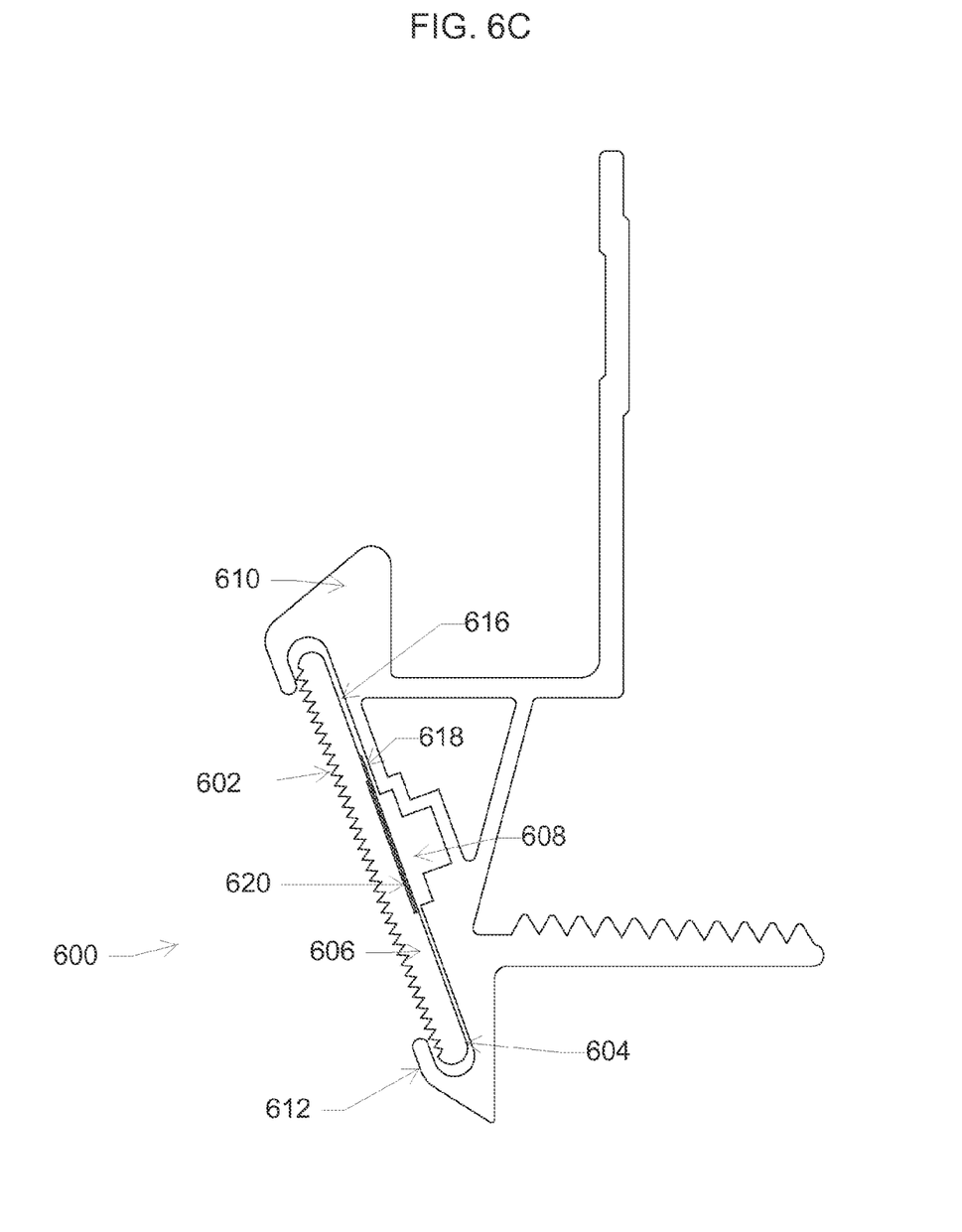
FIG. 6C depicts the fastening slat of FIG. 6A inserted in a side rail according to embodiments.

FIGS. 6A-6C depict an embodiment of a fastening slat 600. For example, FIG. 6A shows a top view of fastening slat 600 having a fastening portion 602 coupled to a substrate or backing 604. Fastening portion 602 may be a hook or loop fastener that is configured to couple with a corresponding hook or loop fastener of a flexible pickup bed cover. For example, a hook and loop fastener may include a backing 604 on which the hooks and/or loops are formed. In some embodiments, other types of fasteners, such as magnets and/or snaps may be used instead of, or in conjunction with, the hook or loop fastener to couple fastening slat 600 with a flexible cover. The backing 604 may be wrapped around an elongated slat 606, as shown in FIG. 6B. In some embodiments, the backing 604 may include one more wings 616 that extend beyond an outer periphery of the fastening portion 602. The fastening portion 602 may be positioned over at least a portion of the top surface of the elongated slat 606 with the one or more wings 616 wrapping around at least one of the edges of the elongated slat 606 such that at least a portion of each of the one or more wings 616 extends along at least a portion of the bottom surface of the elongated slat 606. The wings 616 may be secured to the bottom surface of the elongated slat 606 using an adhesive, stitching, sonic welding, and/or other coupling method. In some embodiments, multiple methods of securing the two ends to each other may be used. This may increase the strength of the coupling and/or provide a failsafe on the chance that one of the securement methods fails. By securing all or a large portion of the bottom surface to the one or more wings 616, release forces are distributed across all or substantially all the portions of the one or more wings 616 that are in contact with the bottom surface of the elongated slat 606. This prevents excess force from affecting a small area of the backing 604.

In some embodiments, the wings 616 may be secured to each other in addition to, or instead of, with the elongated slat 606. For example, two wings 616 may extend from opposite sides of the backing 604 and wrap around the elongated slat 606. The two wings 616 may be coupled to one another and/or may be secured directly to the elongated slat 606, such as on the bottom surface. For example, a first wing having a first end 618 and a second wing having a second end 620 may extend from opposite sides of backing 604. The first end 618 may overlap with at least a portion of the second end 618 such that a sleeve is formed. The two wings 616 may be coupled with an upper surface of one end contacting a lower surface of the other end, or by having both upper surfaces or both lower surfaces of the ends 618 and 620 in contact with one another. While shown wrapping around a longitudinal axis of the elongated slat 606, it will be appreciated that one or more wings may wrap around an axis transverse to the longitudinal axis of the elongated slat 606. In some embodiments, two or more wings may extend from adjacent sides.

In some embodiments, the backing and wings may form a sleeve that is slidably removable from the elongated slat. In such embodiments, the wings may be secured to one another and/or to the rest of the backing using one or more of an adhesive, stitching, sonic welding, or other method of securing the surfaces. The removability provides similar advantages as described above with sleeve 304.

The elongated slat 606 may be configured to fit within a channel 608 of side rail 610 as seen in FIG. 6C. Side rail 610 may include one or more retaining members 612 that may secure the elongated slate 606 and backing 604 within the channel 608. In some embodiments, elongated slat 606, channel 608, side rail 610, and/or retaining members 612 may have similar properties as elongated slat 306, channel 308, side rail 310, and/or retaining members 312 described above.

Figure 7:
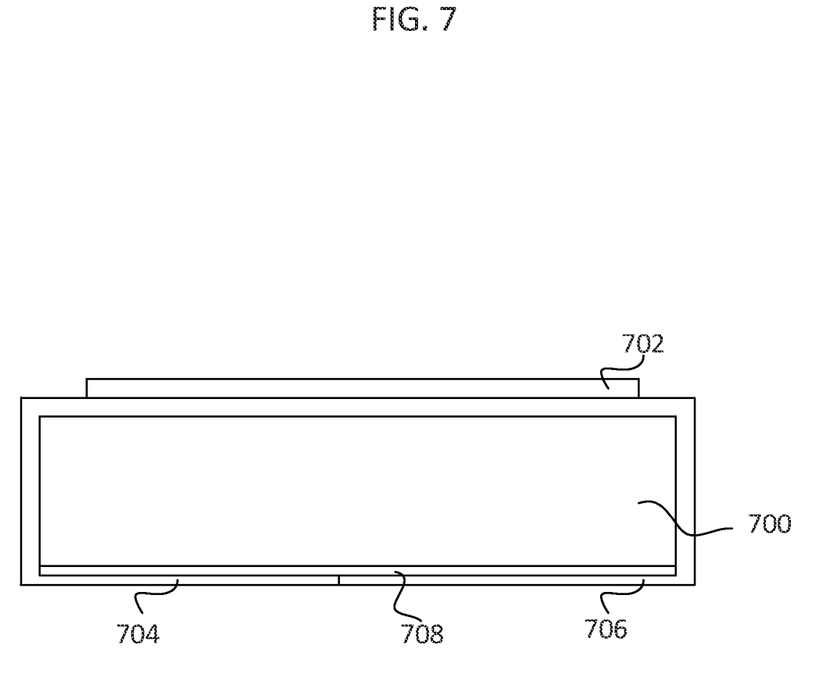
FIG. 7 depicts a side view of a fastening slat having a fastener coupled with an adhesive backing according to embodiments.

FIG. 7 shows a side view of an embodiment of an elongated slat 700 coupled to a fastening portion 702 using a pair of wings extending from a backing. A backing may be coupled with a fastening portion, such as a hook and loop fastener strap, and may include a first wing 704 and a second wing 706. First wing 704 may extend in an opposite direction as second wing 706. The first wing 704 and second wing 706 may wrap around elongated slat 700 such that the wings 704 and 706 may be coupled with a bottom of elongated slat 700. For example, an adhesive 708 may be applied to the first wing 706, second wing 708, and/or the bottom surface of elongated slat 700 such that the wings 706 and 708 wrap around and are secured to all or part of the bottom surface of elongated slat 700.

Figure 8:
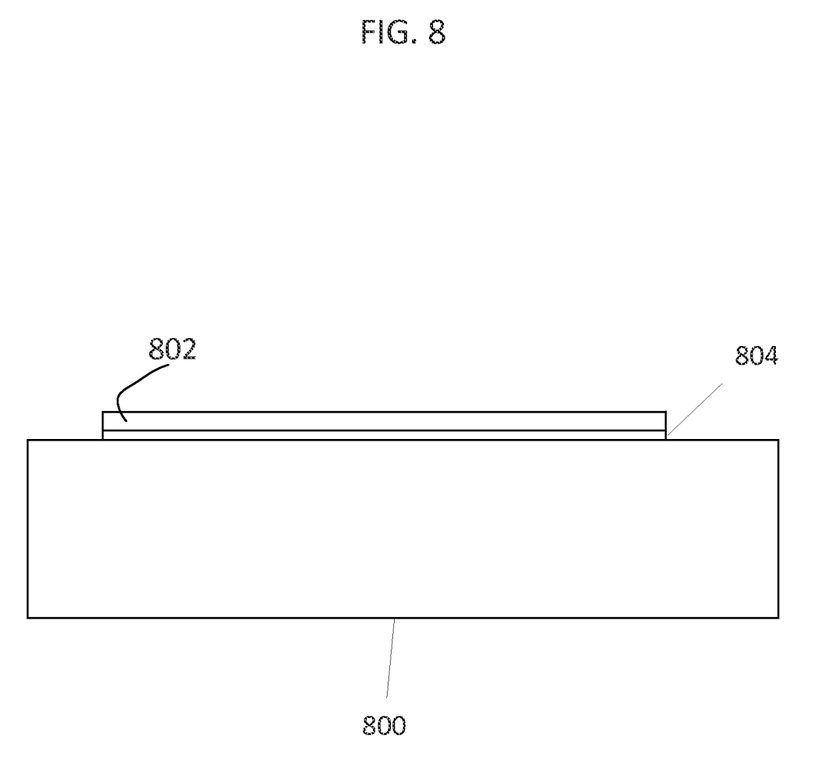
FIG. 8 depicts a side view of a fastening slat having a fastener coupled using an adhesive according to embodiments.

FIG. 8 shows an embodiment of an elongated slat 800 that is coupled with a fastening portion 802. The fastening portion 802 may include a fastener, such as a hook and loop fastener strip that may couple with a corresponding fastener on a flexible cover. The fastening portion 802 may be secured to elongated slat 800 using an adhesive 804.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A fastening system for use in a flexible tonneau cover system for covering and sealing a bed of a pickup truck, the fastening system comprising:
   a side rail arranged on an upper edge of a sidewall of the bed of the pickup truck; and
   a substantially flat elongated slat having a width and a thickness, the elongated slat being inserted in a channel of the side rail; and, wherein
   the elongated slat comprises a first fastening portion configured to be coupled with a substrate of a flexible cover that is extendable over a bed of a pickup truck, the substrate being configured to wrap around at least a portion of the elongated slat such that at least a portion of the substrate contacts a bottom surface of the elongated slat, and the first fastening portion of the elongated slate being coupleable to a second fastening portion arranged on the flexible cover, wherein the elongated slat being separate and distinct from the flexible cover.

2. The fastening system for use in the flexible tonneau cover system for covering and sealing the bed of a pickup truck according to claim 1, wherein:
   the substrate of the flexible cover comprises a sleeve that is slidable over the elongate slat.

3. The fastening system for use in the flexible tonneau cover system for covering and sealing the bed of a pickup truck according to claim 2, wherein:
   the sleeve comprises a rectangular piece of material that is wrapped around a longitudinal axis of the material such that a first end of the material is secured to a second end of the material positioned opposite the first end.

4. The fastening system for use in the flexible tonneau cover system for covering and sealing the bed of a pickup truck according to claim 1, wherein:
   the first fastening portion comprises one of a hook fastener or a loop fastener and the second fastening portion comprising the other of the hook fastener or the loop fastener.

5. The fastening system for use in the flexible tonneau cover system for covering and sealing the bed of a pickup truck according to claim 1, wherein:
   the substrate of the flexible cover comprises a backing having one more wings configured to extend beyond an outer periphery of the first fastening portion; and
   the first fastening portion is positioned over at least a portion of a top surface of the elongated slat and the one or more wings are wrapped around the elongated slat such that at least a portion of the one or more wings extends along at least a portion of a bottom surface of the elongated slat.

6. The fastening system for use in the flexible tonneau cover system for covering and sealing the bed of a pickup truck according to claim 3, wherein:
   the first end is secured to the second end by stitching.

7. The fastening system for use in the flexible tonneau cover system for covering and sealing the bed of a pickup truck according to claim 1, wherein:
   the width of the elongated slat is greater than the thickness.

8. A fastening system for use in a flexible tonneau cover system for covering and sealing a bed of a pickup truck, the fastening slat comprising:
   a side rail arranged on an upper edge of a sidewall of the bed of the pickup truck; and
   a substantially flat elongated slat, the elongated slat being inserted in a channel of the side rail; and, wherein
   the elongated slat comprises a first fastener having a fastening portion and a backing, the backing comprising one more wings configured to extend beyond an outer periphery of the fastening portion, wherein the first fastening portion is positioned over at least a portion of a top surface of the elongated slat and the one or more wings are wrapped around the elongated slat such that at least a portion of the one or more wings extends along at least a portion of a bottom surface of the elongated slat, the first fastening portion being coupleable to a second fastening portion arranged on the flexible cover, wherein the elongated slat being separate and distinct from the flexible cover.

9. The fastening system for use in the flexible tonneau cover system for covering and sealing the bed of a pickup truck according to claim 8, wherein:
   the backing comprises a single wing that wraps entirely around the elongated slat.

10. The fastening slat for use in the flexible tonneau cover system for covering and sealing the bed of a pickup truck according to claim 8, wherein:
    the backing comprises a first wing having a first end and a second wing having a second end extending from a side of the backing opposite the first end;
    the first end overlaps with at least a portion of the second end; and
    the first wing is coupled with the second wing.

11. The system slat for use in the flexible tonneau cover system for covering and sealing the bed of a pickup truck according to claim 8, wherein:
    the one or more wings are secured to the elongated slat through at least one of the following methods: adhering, stitching, and sonic welding.

12. The fastening system for use in the flexible tonneau cover system for covering and sealing the bed of a pickup truck according to claim 8, wherein:
    the one or more wings form a sleeve that wraps entirely around the elongated slat.

13. The fastening slat for use in the flexible tonneau cover system for covering and sealing the bed of a pickup truck according to claim 8, wherein:
    the first fastener comprises a hook and loop fastener.

14. The fastening system for use in the flexible tonneau cover system for covering and sealing the bed of a pickup truck according to claim 8, comprising:

a first wing having a first end and a second wing having a second end, wherein the first end is secured to the second end through at least one of the following methods: adhering, stitching, and sonic welding.

15. A fastening system for use in a flexible tonneau cover system for covering and sealing a bed of a pickup truck, the fastening system comprising:
a side rail arranged on an upper edge of a sidewall of the bed of the pickup truck; and
a substantially flat elongated slat, the elongated slat being inserted in a channel of the side rail; and
a flexible cover extendable over the bed of the pickup truck, the flexible cover having a sleeve configured to wrap around the elongated slat and to extend along at least a portion of a length of the elongated slat; and, wherein
the elongated slat comprises a first fastening portion configured to be coupled with the sleeve, the first fastening portion being coupleable to a second fastening portion arranged on the flexible cover, wherein the elongated slat being separate and distinct from the flexible cover.

16. The fastening system for use in the flexible tonneau cover system for covering and sealing the bed of a pickup truck according to claim 15, wherein:
the first fastening portion is coupled with the sleeve through at least one of the following methods: adhering, stitching, and sonic welding.

17. The fastening system for use in the flexible tonneau cover system for covering and sealing the bed of a pickup truck according to claim 15, wherein:
the sleeve comprises a rectangular piece of material having a first end and a second end extending from a side opposite the first end;
the material is wrapped around a longitudinal axis of the material such that the first end overlaps the second end, and
the first end is secured to the second end.

18. The fastening system for use in the flexible tonneau cover system for covering and sealing the bed of a pickup truck according to claim 15, wherein:
the first end is secured to the second end using a single row of stitching.

19. The fastening system for use in the flexible tonneau cover system for covering and sealing the bed of a pickup truck according to claim 18, wherein:
the first fastening portion comprises a hook and loop fastener.

20. The fastening system for use in the flexible tonneau cover system for covering and sealing the bed of a pickup truck according to claim 15, wherein:
the sleeve comprises an outer surface that is coupled with the first fastening portion and an inner surface that is at least partially in contact with the elongated slat, the inner surface comprising a first end and a second end on an opposite side of the inner surface as the first end; and
the first end of the inner surface is coupled directly to the second end of the inner surface.

\* \* \* \* \*